United States Patent [19]

Fauth et al.

[11] 4,115,791
[45] Sep. 19, 1978

[54] FILM-TRANSPORTING AND SHUTTER-COCKING MECHANISM FOR STILL CAMERAS

[75] Inventors: Günter Fauth; Dieter Engelsmann, both of Unterhaching, Fed. Rep. of Germany

[73] Assignee: AGFA-Gevaert AG, Leverkusen, Fed. Rep. of Germany

[21] Appl. No.: 794,934

[22] Filed: May 9, 1977

[30] Foreign Application Priority Data

May 14, 1976 [DE] Fed. Rep. of Germany ....... 2621437

[51] Int. Cl.² .................. G03B 17/42; G03B 13/02
[52] U.S. Cl. .................. 354/206; 354/219; 354/248
[58] Field of Search ............ 354/204, 206, 219, 223, 354/212, 213, 288, 354, 248, 249, 245, 142, 139, 149, 246

[56] References Cited

U.S. PATENT DOCUMENTS 3,677,158  7/1972  Ort ........................ 354/139
3,913,112 10/1975  Takahama ............ 354/248 X
4,014,033  3/1977  Chan ..................... 354/142
4,032,940  6/1977  Chan ..................... 354/219

Primary Examiner—Michael L. Gellner
Attorney, Agent, or Firm—Michael J. Striker

[57] ABSTRACT

A film-transporting and shutter-cocking mechanism for still cameras of the type in which film is collected in a cassette by a rotary take-up member during forward transport of the film. An input element of the camera having a view finder is movable relative to the camera body in one direction from an operative position to a rest position. A shutter element in the camera is mounted for movement from a cocked position in an opposite direction to a released position. A motion-transmitting arrangement effects movement of the shutter element to the cocked position (i.e., in the one direction) as the input element moves to its rest position. A transmission receives motion from the input element, while the same moves from its rest position to its operative position, and rotates the take-up member to transport the film.

15 Claims, 1 Drawing Figure

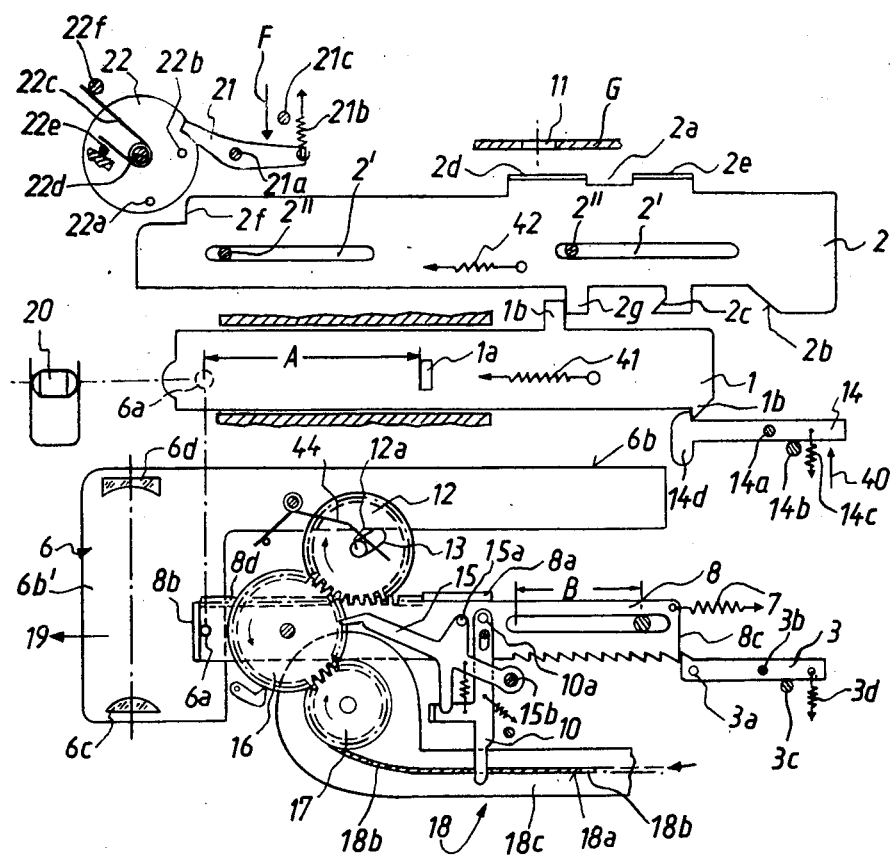

FILM-TRANSPORTING AND SHUTTER-COCKING MECHANISM FOR STILL CAMERAS

BACKGROUND OF THE INVENTION

The present invention relates to photographic apparatus.

More particularly, the invention relates to improvements in mechanisms for transporting film in a still camera and for cocking the shutter of such a camera.

It has already been proposed to provide a still camera with an input member which is movable in substantial parallelism with the direction in which film is transported in the camera, to and from a position in which the input member extends in part beyond the camera housing and is in operative position. The movement of the input member effects cocking of the camera shutter and forward transportation of the film. The film used in such cameras has a longitudinal row of perforations, one for each film frame, and the camera has a tracking device which tracks the advancing film and enters into the respectively oncoming perforation to stop the film transport; at the same time an arresting member moves into blocking engagement with a component of the film transporting mechanism.

The prior-art proposal has certain drawbacks. Among these is the fact that the mechanism required to effect and control the various movements is relatively complicated and therefore expensive. In particular, complicated arrangements must be provided to permit free movement of the input member after the film has been transported and the shutter cocked, i.e., to make it possible to move the input member to, e.g. its rest position without influencing the film transport and shutter mechanism.

SUMMARY OF THE INVENTION

It is an object of the invention to provide an improved photographic apparatus.

A more particular object of the invention is to provide such an apparatus with an improved film-transporting and shutter-cocking mechanism.

A further object of the invention is to provide such a mechanism which is extremely simple and therefore inexpensive to produce. Still another object is to provide a photographic apparatus with a film-transporting and shutter-cocking mechanism which can perform one or more additional functions.

A concomitant object is to provide such a mechanism which occupies little space and is therefore suitable for use even in very small cameras.

Yet a further object is to provide a photographic apparatus with a mechanism as aforesaid and wherein the arrangement, construction and operation of the shutter are particularly simple.

In pursuance of these objects, and of others which will become apparent hereafter, the invention is embodied in a photographic apparatus for use with film which is collected by a rotary take-up member during forward transport of the film to place successive film frames into exposure position. According to one aspect of the invention the apparatus comprises, briefly stated, input means movable in a first direction fron an operative position to a rest position, shutter means including a shutter element movable in an opposite second direction from a cocked position to a released position, motion-transmitting means for moving the shutter means to the cocked position in response to movement of the input means to the rest position thereof, and transmission means receiving motion from the input means to rotate the take-up member during movement of the input means from the rest position to the operative position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE is a diagrammatic illustration of an embodiment of the invention.

DESCRIPTION OF A PREFERRED EMBODIMENT

The FIGURE illustrates an exemplary embodiment of the invention. In order to simplify the illustration the camera housing has been omitted. Also, the elements shown in the drawing are illustrated in an exploded view so as to make them clearly visible.

The FIGURE shows a portion of the film gate G provided with an exposure aperture 11 through which scene light enters the camera to make an exposure of the film frame (not shown) which is in exposure position. An input member 6 is movable in the direction of arrow 19 with reference to the (not illustrated) camera housing to an operative position (shown in the drawing) and to a rest position (counter to the arrow 19). A portion 6b' of the input member 6 may be provided with the diagrammatically illustrated viewfinder 6c, 6d; when the member 6 is in the illustrated operative position this viewfinder 6c, 6d is accessible for use, i.e., a user of the camera can look through it. When the member 6 is in the not-illustrated rest position, the viewfinder is blocked by the camera housing; in this rest position another portion 6b which extends, e.g. normal to the portion 6b', extends across the (not illustrated) lens of the camera and across the exposure aperture, to protect them. The element 6 may be arranged at the exterior of the camera housing and is slidable in and opposite to the direction indicated by the arrow 14, in substantial parallelism with the direction in which the film 18a is transported in the camera.

The film 18a is accommodated in a film cassette 18 (e.g. of the type 110) which has a pay-out section (not shown) that is connected to the illustrated take-up section by the partly shown film channel 18c. These cassettes have as part of their take-up section a rotary take-up spool (not shown) on which the film 18a is taken up during its forward transport. The spool is connected with the illustrated gear 17 so that it receives motion from the gear (which constitutes a rotary take-up member) when the same is rotated. It will of course be appreciated that the cassette 18 and the film 18a which are both shown spaced from the exposure aperture 11 for the sake of improved illustration, will in actual fact be located closely behind the aperture 11. The film 18a is provided with the longitudinally extending row of perforations 18b, one perforation for each film frame.

The input member 6 effects, during its movement to the operating position (in direction of arrow 19) a forward transportation of the film 18a by the length of one film frame; during its movement to the rest position (counter to arrow 19) the member 6 effects cocking of the shutter which has the illustrated slidable shutter member 2 provided with two longitudinally spaced blade portions 2d and 2e (in the FIGURE these should be understood to be upstanding from the plane of the FIGURE) which define between each other a slot-shaped shutter aperture 2a. The FIGURE shows the shutter in cocked position and the film 18a in transported condition (i.e., with a film frame in position to be exposed).

A shutter release comprises a member 14 which is pivoted at 14a and is normally biased against an abutment 14b by a spring 14c. The member 14 has a portion 14d which in the illustrated camera condition engages behind a projection 1b of a slidable percussion or impact member 1 which is permanently biased (leftward in the FIGURE) by a spring 41. When the shutter release member 14 is tripped by a user who exerts pressure upon it in the direction of arrow 40, its portion 14d releases the member 1 so that the same is now propelled leftward as the energy stored in the tensioned spring 41 is discharged. At the end of its movement the member 1 impacts a piezo-electric crystal 20, thus causing momentary compression of the crystal which results in the well-known generation of a piezo-electric current. This current is used to fire a flash bulb or flash cube (not shown) that is inserted in the (also not shown) flash socket of the camera.

The shutter member 2 is biased towards the left in the FIGURE by a spring 42. It is guided for movement by pins 2" (e.g. on the camera housing) which extend into slots 2' of member 2 (the reverse arrangement is evidently also possible). The spring 42 is chosen to be weaker than the spring 41, because it is desired that the shutter member 2 trail slightly behind the member 1 when it moves from the cocked position (illustrated) to the released position. Since the projection 1b on member 1 and 2g on member 2 engage one another as shown, the shutter member 2 is retained in the illustrated cocked position until the member 1 is released for its leftward movement by operation of the shutter release member 14. As the shutter member moves to the left, slightly trailing the member 1, its shutter aperture 2a moves past the exposure aperture 11, thereby permitting scene light to reach the film frame which is in exposure position.

If the camera is being used in the flash mode, i.e., if a flash attachment or bulb is inserted into the flash socket (not shown) of the camera, in the direction indicated by the arrow F, a portion of the attachment or bulb (not shown) will press in the direction of arrow F upon a lever 21 which is pivoted at 21a and which is normally biased against an abutment 21c by a spring 21b. When the lever 21 is so pivoted (in clockwise direction) its left-hand end becomes disengaged from a pin 22 provided on an inertia wheel 22. The wheel 22 is turnable about a pivot 22d and is biased in anti-clockwise direction by a hairpin (or other suitable) spring 22c which reacts against a stationary abutment 22f (e.g. on the camera housing) and a pin 22e on wheel 22. Release of the pin 22b by the lever 21 therefore allows the wheel 22 to turn in anti-clockwise direction until a pin 22a — which previously was located outside the path of movement of an endface 2f of shutter member 2 — now is located in this path. When the endface 2f impinges the pin 22a the member 2 must overcome the inertia of wheel 22 and the spring 22c; these factors are so chosen that the member 2 is capable of overcoming them but that its movement will be slowed down in so doing. In consequence, the shutter aperture 2a will require a longer time to travel past the exposure aperture 11 than otherwise, and this results in a longer exposure time for the respective film frame. Of course, if no flash attachment or bulb is being used, the lever will be pivoted by its spring 21b into contact with the abutment 21c; this causes its left end to engage the pin 22b and to turn the wheel 22 clockwise until the pin 22a is located outside the path of movement of the endface 2f, thereby restoring the shorter exposure time.

During the leftward movement of shutter member 2 an inclined cam face 2b of the same engages a pin 3a of a blocking pawl 3 which is pivoted at 3b and permanently biased against the illustrated abutment 3c by a spring 3d. Upon engagement with the pin 3a the cam face 2b pivots the pawl 3 anti-clockwise so that the pawl 3 becomes disengaged from a slide 8 which is biased towards the right by a spring 7. Another inclined cam face 2c of shutter member 2 engages a follower 10 whose front end is located in a film perforation 18a and retracts the follower 10 out of this perforation; the cam face 2c also engages a pin 15a of an arresting member 15 and causes this arresting member to tilt in clockwise direction about a pivot 15b, with a resulting disengagement of member 15 from a gear 16 (to be discussed later).

The slide 8 would now be free to move to the right under the influence of spring 7; however, it has a portion 8b which engages behind a pin 6a of input member 6. The spring 7 is not strong enough to cause rightward movement of member 6, only to cause portion 8b to remain in following engagement with pin 6a. If the member 6 is now pushed to the right (to rest position), the slide 8 will follow this movement under the influence of spring 7.

As the member 6 is pushed to the right (counter to arrow 19) the pin 6a engages a projection 1a of member 1 so that the latter is compelled to move to the right also, stressing the spring 41. Furthermore, during such movement of member 1 the projection 1b thereof engages the projection 2g of member 2, taking the member 2 along to the right and stressing the spring 42 (cocking the shutter). The member 8 has a portion 8a which moves in front of the exposure aperture 11 before the shutter aperture 2a passes the same (this prevents a double exposure of the previously exposed film frame) and before the pin 3a of pawl 3 is released by member 2 so that the pawl 3 can return to its illustrated position.

A gear 12 is a part of the transmission which effects take-up of the film 18. It has a shaft 12a which is mounted for rotation but which can also slide lengthwise in a slot formed, e.g. in a component that is stationary with the housing. Gear 12 meshes with a rack 8d of member 8. A gear 16 is mounted for rotation on the member 8 and in turn meshes with the gear 17 of cassette 18. Gear 12 is biased into meshing engagement with the gear 16 by a (relatively weak) spring 44. The direction of inclination of slot 13 is so selected as to take account of the transmission forces which develop in a gear transmission and the direction in which they act so that, when the member 8 is moved to the right with the input member 6, the gear 12 can yield lengthwise of the slot 13 with its shaft 12a, so that its teeth disengage from (or at least slip ineffectually over) the teeth of gear 16. This makes a transmission of motion between gears 12, 16 (and to gear 17) impossible during cocking of the shutter and prevents reverse transportation of the film. Of course, when member 8 moves in the direction of arrow 19, the gear 12 is again biased into motion-transmitting engagement with gear 16 by the spring 44; it is maintained in such engagement by the forces which acts between the teeth of the gears 12, 16. During the movement of member 8 in direction of arrow 19, which is imposed upon it via pin 6a and portion 8b when the member 6 is being moved to operative position (i.e., leftwards), the film 18a in cassette 18 is transported forwardly by gears 12, 16 and 17 by the length of one film frame, namely until the follower 10 (whose front end is biased against the film 18a by the illustrated spring and thus tracks the film) enters the next oncoming perforation to stop the film movement substantially instantaneously, while the rotation of gear 16 is stopped by pivoting of the member 15 to the illustrated position in which it engages the teeth of the gear 16 and prevents its further rotation. The camera is then ready for the next exposure.

By deliberate choice the distances A and B through which the members 1 and 8 must be moved to stress their associated springs fully, are so long that the input member 6 can be freely moved between its operative and inoperative positions (once the members 1 and 8 are in the positions where their springs are fully stressed) without thereby causing any transportation at all of the film 18a. This freedom of movement is, of course, also necessary to permit the input member 6 to be moved to its rest position when the end of the film 18a has been reached; heretofore, special arrangements were required for this circumstance, e.g. slip couplings or the like.

The member 1 deliberately is made to travel through a relatively long distance before it impacts the crystal 20. The purpose of this is to obtain a high impact force (and optimum ignition current from the crystal 20) with the use of a relatively weak spring 41.

The shutter mechanism is particularly simple because it relies only upon the use of the member 2 with its two portions 2d, 2e which define the aperture 2e, in cooperation with the portion 8a on member 8.

The above-described embodiment is susceptible of various modifications. For example, the illustrated member 1 could be guided in a different manner, and it could be replaced with a bar of circular or polygonal cross-section that is guided for sliding movement in a suitable manner, e.g. in portions of the housing or by one or more bushings. The members 1, 2 and 6 have been shown laterally adjacent one another for clarity of illustration; however, to obtain a particularly small camera size they can be located above or below one another.

While the invention has been illustrated and described as embodied in a still camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a photographic apparatus for use with film which is collected by a rotary take-up member during forward transport to place successive film frames into exposure position, a combination comprising input means movable in a first direction from an operative position to a rest position; shutter means including a shutter element movable in an opposite second direction from a cocked position to a released position; motion-transmitting means for moving said shutter means to said cocked position in response to movement of said input means to said rest position thereof; and transmission means receiving motion from said input means and including a slide member mounted for movement with said input means and a gear mounted on said slide member to rotate the take-up member during movement of said input means from said rest position to said operative position.

2. A combination as defined in claim 1, and further comprising means for arresting said gear to effect termination of the movement thereof in response to completion of film transport by the length of a film frame.

3. A combination as defined in claim 2, wherein said arresting means comprises a scanning device arranged to track the film, and an arresting element which is moved into arresting engagement with said gear in response to completion of each film transportation by the length of one film frame.

4. A combination as defined in claim 3, wherein said arresting element is a pawl pivotable into engagement with the teeth of said gear.

5. A combination as defined in claim 3, wherein the film is provided with a longitudinal row of perforations, one perforation for each film frame, and wherein said scanning device comprises follower means arranged to track the film during transportation thereof and to enter into the respectively oncoming perforations thereof to terminate transportation of the film substantially instantaneously and to simultaneously effect the movement of said arresting element into arresting engagement with said gear.

6. A combination as defined in claim 1, wherein said input means comprises an input member which is shiftable in said first direction substantially parallel to the direction of film transport.

7. A combination as defined in claim 6, wherein said slide member is slidable in said first and second directions and arranged to follow the movement of said input means from the operative to the rest position thereof.

8. A combination as defined in claim 6, wherein said slide member is slidable in said first and said second directions and arranged to follow the movement of said input means from the operative to the rest position thereof; blocking means engaging and blocking said slide member against movement in said first direction when said input means are in said operative position; and a cam portion on said shutter element and arranged to disengage said blocking means from said slide member in response to movement of said shutter element in said second direction.

9. A combination as defined in claim 1, wherein said shutter element moves with reference to an exposure aperture of the camera and is provided with two shutter blade portions which are spaced from one another in said first direction and define between themselves a shutter aperture.

10. A combination as defined in claim 9, wherein said slide member is slidable in said first and second directions in response to movement of said input means between the respective positions thereof, said slide member having a cover portion arranged to cover the exposure aperture during the movement of said shutter element relative to the same from said released to said cocked position.

11. A combination as defined in claim 1; further comprising a percussion member movable with said input means in said first direction to an energy-storing position in which it is biased in said second direction, said motion-transmitting means comprising cooperating motion-transmitting portions on said percussion member and said shutter element.

12. A combination as defined in claim 11; and further comprising release means arranged to release said percussion member and said shutter element so that they travel consecutively in said second direction.

13. A combination as defined in claim 1, said film being provided with a longitudinal row of perforations, one for each film frame; further comprising arresting means for arresting said gear in response to completion of film transport by the length of a film frame, including a follower arranged to track the film during transportation thereof and to enter into the respectively oncoming perforations thereof, and an arresting element arranged to be moved into arresting engagement with said gear in response to entry of said follower into a respective perforation; and further comprising means on said shutter element for retracting said follower from the respective perforation and for moving said arresting element out of engagement with said gear in response to movement of said shutter element in said second direction.

14. A combination as defined in claim 1; further comprising means biasing said shutter element for movement in said second direction at a predetermined speed; and means for changing said speed.

15. A combination as defined in claim 1; and further comprising viewfinder means on said input means, movable with the same and being accessible for use when said input means are in said operative position thereof.

* * * * *